UNITED STATES PATENT OFFICE 2,442,449

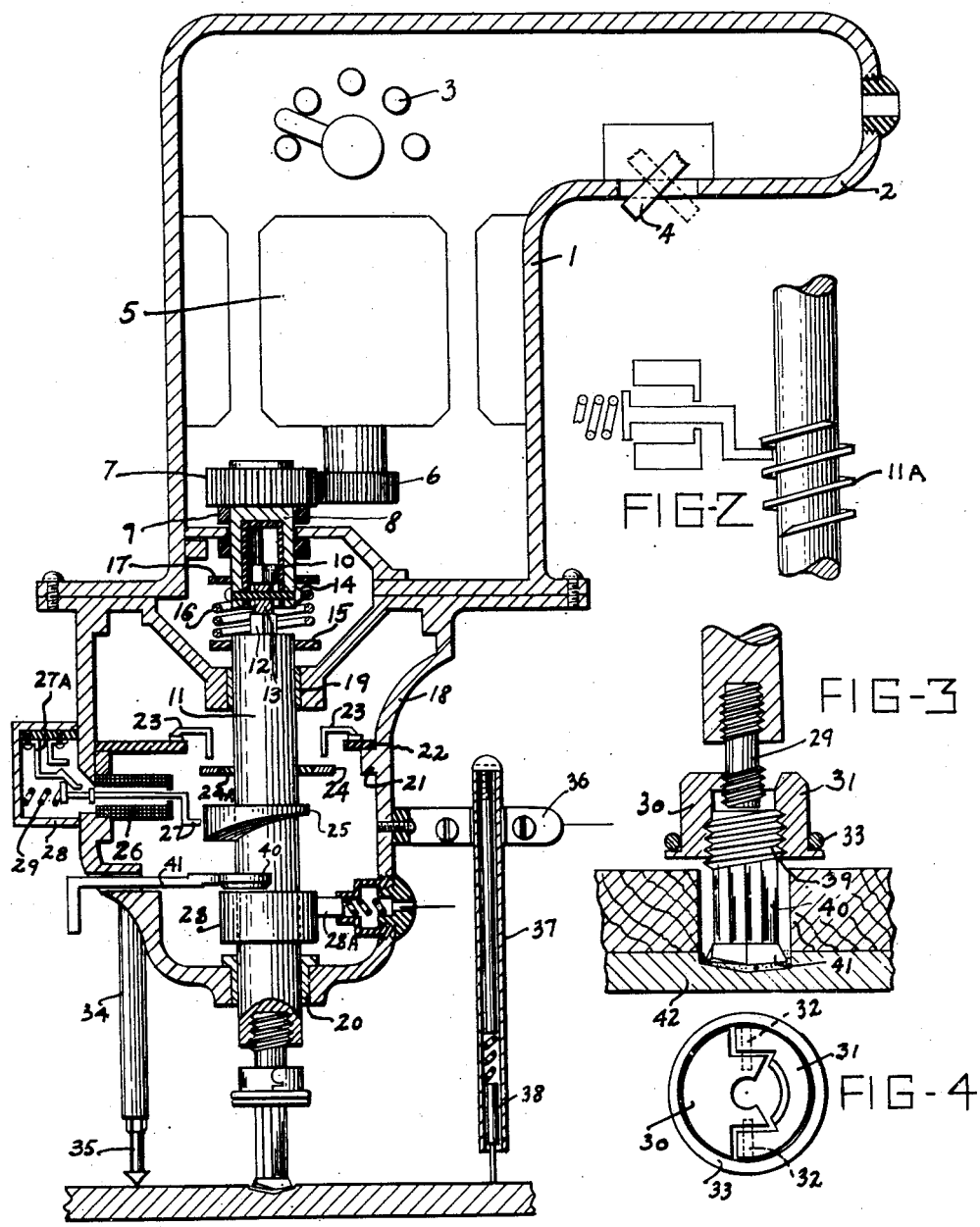

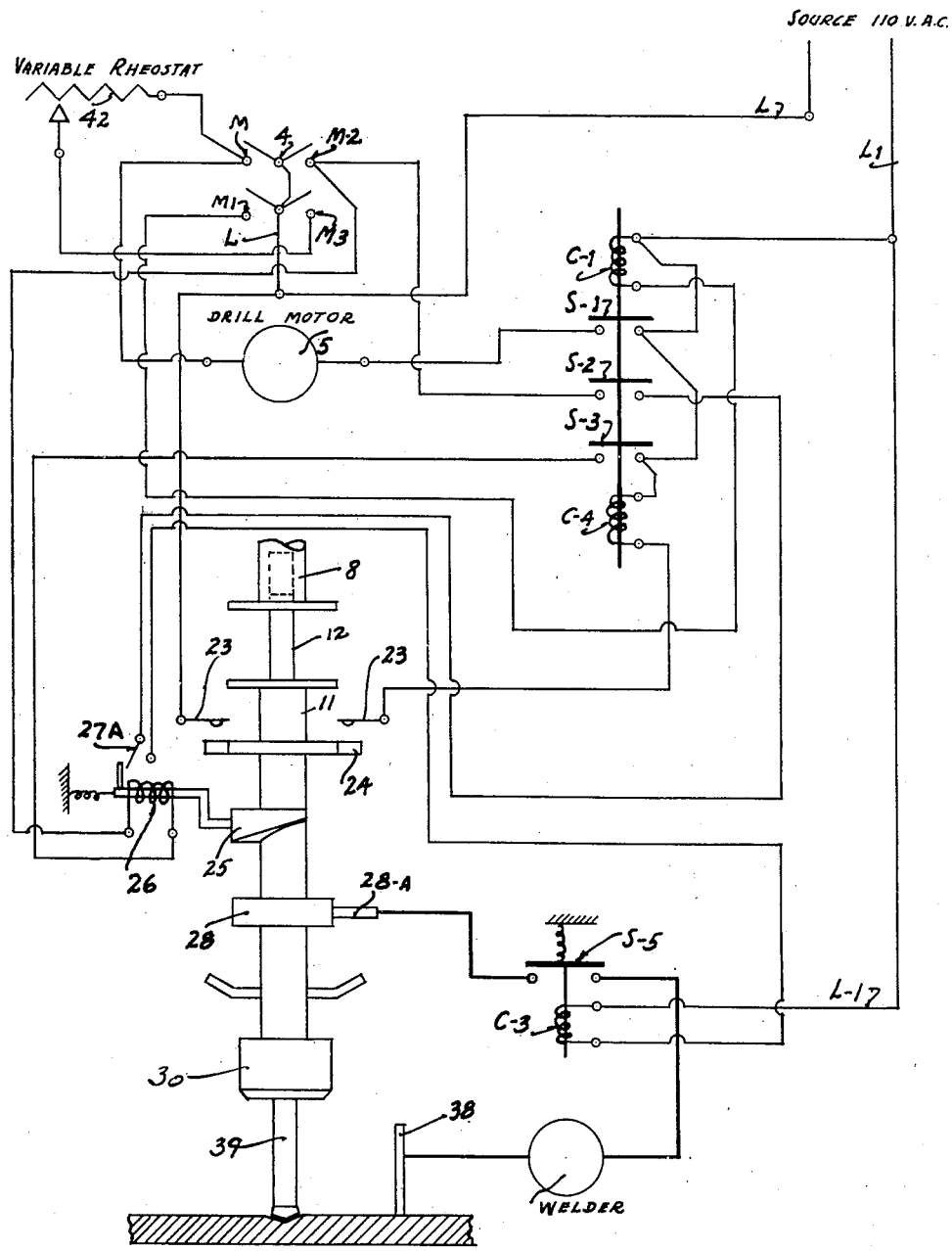

ELECTRIC WELDING TOOL

Robert F. Zimmerman, Cincinnati, Ohio, assignor to Lathrop-Hoge Construction Company, Cincinnati, Ohio, a partnership Application April 22, 1944, Serial No. 532,315

12 Claims. (Cl. 219—4)

My invention is a rotary welding device for holding and rotating a boring electrode which may be a fastening device, and which is one of two electrodes creating an arc, the other electrode being the work with which the boring electrode is fused due to the application to it while rotating of a suitably controlled electric current, through the medium of a current collecting system of slip rings and brushes or other suitable means.

The rotary device, for holding the electrode, may be a self-contained auxiliary chuck, adaptable to present tools, such as a portable electric drill or nut runner or the like, or it may be adaptable for use in a drill press or lathe, in short, any suitable rotating machine. It, of course, may be an integral part of and built into any of the above machines. In any case, however, the auxiliary chuck, or the tool containing the elements of the chuck, will necessarily contain or have as an adjunct a necessary rotary current collecting system, electric or electronic controls, conventional holding devices such as snap chucks, screw drivers, etc. which may be magnetic or not, depending upon the controls, and the service in which they are to be used.

A major difference in my invention over other portable welding tools of its nature, is the employment of rotary motion, and the inherent ability of all revolving tools to bore into and through hard or relatively impervious materials such as wood, transite, gypsum, or metals, by the use of suitable boring electrode attachments, held by the rotary machine which may be a portable electrode drill; or stationary machine like a drill press or lathe. On construction work, my portable welding tool immediately eliminates pre-drilling of holes in facing materials like lumber, transite and gypsum, before welding the fastener which holds them in place, as is now the necessity among other portable welding tools.

Another major difference in my invention over other portable welding tools employed to weld a pin or the like to a backing sheet is the method of creating the arc.

The principal mode of operation used in the past is the touching of one electrode to the other, then separating them to draw the arc, and then pushing the one into final welded position, all by a pure reciprocatory movement. In my device the electrode is withdrawn in creating the arc, but is rotated at the same time, with decided advantages to be noted.

As preferably arranged, the raising of the drill electrode away from the other electrode is an integral part of the function of the mechanical timing device, used to time the duration of the arc, and also to regulate its length. The shape of the spiral lifting cam which is infinitely variable, used in combination with the rheostat for governing the rotary speed of the electrode, constitutes the timing system, which precludes the use of customary timing devices, and utilizes only the inherent rotary motion of the tool, which, of course, is not possible in portable welding tools now in use.

Another type of welding tool depends on creating an arc by coating the end of the pin or electrode to be welded in place with filings and chips of metals which flux when current is applied. By the use of rotary movement in my invention, I utilize the natural and inherent ability of my drill electrode to create chips and filings from and in, the other electrode or work when rotating in contact with the work to which it is to be attached, adding nothing, but utilizing the advantage of readily fusable chips in creating the desired arc.

In another case the arc is formed by holding a sharply pointed electrode against the other electrode or plate and melting off the tip when current is applied, thus creating a gap. My invention does not require any such arrangement for creating the arc, although drillings, and chips, as well as fins formed on the drill electrode, etc., serve an analogous function in facilitating the proper arc.

Through the option of the use of any desired boring electrode device which comprises a suitable fastening device taking the place of a stud bolt, or nail, or the like but which is equipped with the boring end of any suitable type, and composed of any suitable alloy which is harder than the facing material such as wood, transite, etc. and at least equal in hardness to the other electrode or work, to which it is to be welded as a fastener of the wood, etc., I can bore through the relatively impervious facing material; and then naturally create metal chips, cuttings and fins, while boring a crater, or if desirable a hole, in the work or other electrode. I then apply rotating and welding current and my welding tool lifts the boring electrode upward while simultaneously causing it to rotate, thereby creating an arc by the withdrawal from contact and the fluxing of the chips and/or fins present between the electrode and base plate. After suitable timing, the electrode is pushed down to weld it in or on the base plate.

Through the choice of suitable alloys, and shapes in the boring devices, and the choice of the devices used or adjustments thereof, I can create in the base plate a crater or metal mold of any desirable depth, thereafter proceeding with the same sequence of operation as previously described, thus achieving complete control over penetration and therefore fusion, of weld metal into the base metal, which is the most important consideration in the strength of a weld.

By the use as an electrode of the drill or boring tool which penetrates paint, scale and surface impurities, a good clean electrical contact between electrode and work is assured. Controlled depth of penetration of the drill type electrode into the work can be obtained by simple adjustment, and a feature of my practice is that it creates, if desirable, a metal mold in the base plate by the rotary action of the electrode.

Indeed the regulation of timing and lineal length of the previously formed arc, and the simultaneous rotary motion of the electrode, caused by the lifting action of the welding device creates a condition analogous to centrifugal casting accompanied by the outward rotary disposition of the non metallic gases and impurities generated in the welding zone.

An interesting and valuable system is used if desirable and possible with my tool. It is the housing or on or fastening of, as integral part of the tool, the return circuit, namely a properly insulated pole or leg, adjustable for length as shown on the drawing, so that the amount of travel of the current through the "work" is at a minimum. This makes the voltage drop constant and cutting costs in some cases, overcomes the inability to get a good return circuit such as encountered in a suspended ceiling, through the work. The cables are co-axial in this case and therefore save the operator the time of constantly changing his circuit connections.

I have illustrated my invention in a selected embodiment which is depicted in the drawings and will be described. The invention inherent in this example and other equivalent embodiments of my invention will be set forth in the claims appended hereto, to which reference is hereby made.

In the drawings:

Figure 1 is a vertical section partially diagrammatic through a portable tool according to my invention.

Figure 2 is a detail illustrating an alternative arrangement to the lifting and timing cam shown in Figure 1.

Figure 3 is a detail section of a preferred type of chuck, showing an electrode therein.

Figure 4 is a plan view of the chuck of Figure 3.

Figure 5 is a wiring diagram showing the tool and the electric hook-up, which will be located in a control box connected to the tool by suitable wires and cables.

The casing in the illustrated tool is in two parts, the casing portion 1, at the upper end of which is the housing portion 2 in which is located the rheostat indicated diagrammatically at 3. In this upper housing portion is also mounted the double throw control switch which is operated by a finger piece 4 at the grip portion of this housing. In the casing portion 1 is located an electric motor 5 with an offset drive consisting of pinion 6, gear 7 and stub 8 supported in a suitable bearing 9.

The lower end of the stub shaft 8 is hollow and is equipped with a dielectric bushing 10 in which telescopes the upper end of the tool shaft 11. This upper end as indicated at 12 is smaller than the rest of the tool shaft, and is equipped with a slot 13 near its upper end which is traversed by a driving pin 14, preferably of dielectric material or faced therewith, which pin is held in the lower end of the hollow portion of the stub shaft. A disk of insulation material as at 15, is mounted near the upper end of the main portion of the tool shaft, and a spring 16 surrounds the upper end of the tool shaft and bears on a shoulder 17 developed on the lower end of the stub shaft. This structure is provided so that the stub shaft drives the tool shaft, but the tool shaft may rise by sliding over the driving pin and telescoping into the stub shaft. Any other suitable mechanism which permits of proper insulation for the tool shaft can be used for the indicated purpose.

The lower portion 18 of the casing provides a bearing 19 for the upper end of the tool shaft, and a bearing 20 for the lower end thereof. Mounted on pads 21 within this casing, suitably insulated therefrom as by mounting plates 22, are two resilient electric contacts 23, independently connected in one circuit of the control current. Located on the tool shaft is a disk of insulation 24a carrying a copper ring 24, which when the tool shaft is in its upper position will establish contact between the contacts or terminals 23.

Located on the tool shaft 11 is a cam collar 25. A solenoid 26, the armature 27 of which projects into a spring retaining housing 28, includes a spring 29, which acts as a tension spring to hold the armature outwardly. The inner end of the armature is directed toward the axis of the tool shaft 11 in such a position that when the solenoid 26 is energized the armature is thrust toward the cam collar, in such a position that its end will ride under the low portion of the cam. The armature also carries an abutment which will close and maintain closed a small spring switch 27A which, as will be noted, completes the connections for welding current application to the tool shaft.

The tool shaft has a wide copper ring 28 thereon against which rests a usual type of carbon brush 28A, through which welding current is applied to the tool shaft.

The lower end of the tool shaft where it projects from the casing portion 18 has a suitable chuck arrangement which will preferably be of material which does not fuse to the electrode member. In Figure 3 I have illustrated a chuck of a type which has a threaded stem 29 that screws into the end of the tool shaft and a body formed of two hollow sections 30 and 31, both of which are internally threaded, the member 30 receiving the stem. The two halves are hinged together by means of hinge pins 32 (Figure 4) so that one of the sections will swing away from the other, but when the two sections are closed against each other, a threaded bore will be presented into which the electrode is screwed so that its end rests against the end of the stem 29. A ring 33 which is dropped over the assembly or raised away therefrom, serves to hold it closed during use, and to quickly and completely release the electrode after it has been welded in place.

The casing portion 18 is equipped with a series of projecting posts 34 which are internally threaded to receive spacing screws 35. Also a bracket 36 on the casing portion 18 is used, where the work permits for mounting adjustably a sleeve 37, in which is a spring pressed plunger 38. The sleeve is connected to one end of the welding current circuit, the other end of which is connected to the carbon brush holder. The plunger 38 may thus be used to establish contact with the work close to the welding point.

As so arranged, the electric wiring and control are such that the operator proceeds preferably as follows: First placing an electrode in the chuck, the operator swings the double throw switch to apply current to the motor which is then used to drill or screw the electrode through facing material into the work. The electrode as illustrated more particularly in Figure 3 has a threaded body 39 or a body otherwise suitably shaped for chucking on the tool shaft, a fluted portion 40, in which chips and metal particles will lie or be removed from the hole when the electrode is inserted in the work, and a bit type end portion 41 slightly larger, preferably, than the shank. This, of course, is only one type of suitable electrode.

The motor operation will result in causing the electrode to drill its way through a sheet of material, such as wood or transite, to be attached to a base member, and then will start to drill away and enter the other electrode or base member, sheet, beam, frame or what not to which the drill electrode is to be secured by welding. Such a base sheet is illustrated at 42, and the adjustment of the posts 34 will be such that the drilling operation will continue to a sufficient extent to form a crater in the base sheet. This may be quite shallow or can be developed into a hole of whatever penetration may be desired. When the adjustment posts have bottomed the drilling operation is stopped by throwing the double throw switch to neutral.

Then the double throw switch is thrown so as to set up a series of circuits, one of which sends current to the motor through the rheostat 42, thus obtaining a controlled speed of rotation of the motor. Another circuit sends current through the solenoid for the cam engaging armature, which is thrust toward the cam sleeve on the tool shaft. Another circuit is established which will send current through a relay for closing the welding current circuit, but this relay will not operate until the solenoid for the cam engaging armature has moved far enough to ride under the low portion of the cam surface. The motor will be revolving the electrode idly in contact with the work until this solenoid armature has moved to home position beneath the cam whereupon the welding current will be applied and the tool shaft will start to rise. When the tool shaft has risen through the distance for which the cam was cut, the switch contacts 23 will be connected by the ring 24, whereupon all switches will be opened even though the double throw switch is held in welding position.

The withdrawal of the electrode will draw an arc. The chips and drillings will fuse, the electrode will rotate during this action to impart a centrifugal action to the fusing metal, and form a pool of fused metal in the crater or hole in the base sheet. When the cam is released by springing back of the solenoid armature, the spring bearing on the tool shaft which opposes its rise will force the shaft downwardly ramming the electrode which will still be rotating slightly due to inertia of the motor, into the crater which was formed, resulting in a tight weld.

It may be desirable in certain instances instead of using the tool with an electrode which drills its way into the work, to bore a hole in the work first and introduce the electrode later either with some additional drilling or not, and operate the device for drawing the arc, in the described rotary manner, and then hammering the electrode home in the crater formed for it.

It is noteworthy that the timing of the arc in the use of the tool is performed by the dimensions and pitch of the cam and also the speed of operation of the motor.

This novel timing mechanism has the inherent advantage of always being constant under any given set of conditions, for the reason that the drill electrode has penetrated the paint and rust or scale on the base metal, thereby achieving an excellent contact for every weld. This unusual ability not enjoyed by non-rotating welding tools, immediately precludes time lag encountered in other tools by their inability to guarantee good contact. In addition to this feature, a second safeguard also guarantees correct timing, and this is the fact that welding current can only flow, after the lifting pin has engaged the cam.

In ordinary practice after the adjustable abutments 35 have contacted the work, the spring tension on the shaft which may have been built up during drilling will continue to rotate the drill point to a definite position. However, in order to insure that the tool carrying shaft will always end its drilling operation at a definite position, I may supply my tool with a device to prevent endwise movement during drilling. This may be done electrically with a solenoid, but I have here shown a fork 40, which straddles the shaft 11 when pushed inwardly by means of the rod 41 of which it is the terminus. By bearing on the top of the collecting ring, this fork will assure a definite position of the shaft during drilling and it must be withdrawn to start the welding portion of the operating cycle.

Instead of a single spiral cam surface, it may be desirable to lift the electrode further or extend duration of arc in which case the preferred practice is to employ a structure such as is illustrated in Fig. 2. In this view the tool shaft is equipped with a thread 11A, and the solenoid armature is thrust in to engage the screw.

Referring now to the diagram—the double throw switch indicated by numeral 4 may be thrown to establish contacts M and M—1, to supply regular driving current to the motor 5. The line connection to the switch is indicated at L. The other incoming lead for regular supply is indicated at L—1. Closing of contact M—1 will send current through a suitable lead to the solenoid C—1, which solenoid operates a series of switches to bring them to closed position. The first of these is the switch S—1, which when closed contemplates a circuit through the windings of the motor. The switches S—2 and S—3 which are closed by the same solenoid do not have any effect during the drilling portion of the cycle of operations. As so far described the double throw switch has set the motor in motion and the drilling is carried on until the proper crater has been formed in the work.

The operator then throws the double pole switch through neutral position to the position to make contacts M—2 and M—3. The contact M—3 sends current through the rheostat 42, and through the motor and the switch S—1, thus completing a circuit for controlled speed driving of the motor. The contact M—2 sends current through the solenoid 26, thence back through the switch S—3 and to the return lead L—1.

By establishing contact M—2 current is sent through the switch S—2, and thence connects up the circuit to solenoid coil C—3, except for the break in this circuit which is established by the switch 27A, which operates as soon as the solenoid thrusts its armature to position at the low point of the cam. While this is taking place the motor starts its slow revolution. When the switch 27A closes this completes a circuit through the coil C—3, and back to the lead-in L—1, and the coil then operates the welding current switch S—5.

Welding current then is applied through the brush 28A, and collector ring 28, and to the return electrode 38. The motor starts lifting the tool shaft at this point, withdrawing the electrode from the base of its crater, and drawing an arc, as has been described. Where the head of the electrode to be fused with the work is larger than the body, there is a spacing between the electrode shank or body and the hole which has been bored into the work. The arc jumps through this space also. This space also acts as an outlet for borings in the facing material.

As soon as the contact ring 24 connects together the contacts 23, current passes from a tap on the lead-in line L, shown as near the connection to the double pole switch, across between the contacts 23, and through a solenoid coil C—4, and the lead-in L—1.

The switches S—1, S—2 and S—3 are of the type which when closed by their operating coil C—1, stay closed upon de-energizing of the coil C—1. But the energizing of the coil C—4, will result in opening all three switches. Thus when the shaft rises for the distance measured by the cam, which will bring the contact ring 24 into position of closing the circuit through coil C—4, all current to the apparatus is turned off. The switch S—5 for welding current is a spring opening switch which opens as soon as the coil C—3 is de-energized, hence the welding current is turned off with all the rest. The solenoid armature having been withdrawn from the cam as soon as the coil 26 is de-energized, the tool shaft will be thrust downwardly with a sudden movement as imparted by the spring, and will thus jam the electrode back down again into the molten metal caused by the arc during the progress of the rise of the electrode.

This completes the cycle of operation, and the parts will remain at rest until the double throw switch is moved to establish contacts M and M—1 to start another cycle of operations.

I have not, by virtue of the mode of wiring the apparatus intended to indicate that this is the only electrical arrangement which will accomplish my object, but merely to illustrate in diagrammatic form a suitable hook-up which I have found satisfactory. The cable to the tool itself will carry the various wires which are needed for connecting up the several circuits with the control box, which will contain the switches and coils now noted as C—1 to C—4, and switches S—1 to S—5. The timing is done by the cam or lifting operation which will be set to correspond with the rise necessary for the contact ring 24 to bridge the contacts 23. The amount of welding current in amperage will depend upon the requirements as will be readily worked out for various operations within the scope of my new tool.

It is apparent that by making the pitch of the cam or thread that lifts the tool shaft a slight one, the electrode may be rotated a number of times, i. e., quite rapidly, during the short burst of arc welding current, without drawing a long arc. Various modifications within the scheme now outlined will be possible with this tool, and in many respects the tool will be valuable as a bench tool as well as a portable one.

Penetration is generally defined as the depth of fusion of the weld metal into the base metal. This must not be confused with "fusion" which is defined as a mixture only of the base and welding metals.

I insure proper control of depth of penetration by the novel use of my rotary electrode drill which is set to drill to any desired depth in the base metal, thereby creating a clean contact surface in the base metal, upon and with which the weld metal is later deposited and fused. It is quite obvious that I can, by this rotary drill, control the quality and strength of the weld by being able to control the penetration into the base metal, and by so doing reduce sizes of members and the cost of same.

In centrifugal casting one of the commonly used molds is made with metal, and is known as a metal mold. In the casting operation the molten metal is whirled against this mold.

With my rotary drilling electrode I am able to, by choice of electrodes or combinations thereof, create a similar mold in the base metal.

After drilling through dense material facing or material such as wood, gypsum, transite, glass, etc. to be fastened to the plates, etc., the second electrode (the base metal) is encountered and I am able by choice of electrode drills to penetrate it to any depth desired, and thus form in the second electrode (base metal) a crater or metal mold. This is always circular, due to the rotary motion of the electrode drill, and depending on the shape of the tip of the electrode drill, the mold may be a cone or a paraboloid or any variation of these. It may be cylindrical with its end a cone or paraboloid, depending on the shape of drill electrode and depth of penetration.

The crater or metal mold thus formed has many of the characteristics of the commonly used plug type weld, only in this case the electrode drill in part, becomes and remains the plug after being partially deposited and fused into the walls of the metal mold it drilled, prior to the application of the welding current to the electrode, and its subsequent partial disintegration.

The centrifugal pressure as applied in centrifugal casting, sometimes called liquid forging, is entirely different from any other forging pressure applied by any other means. It is selective in its action, the larger and heavier components being thrown outward toward the periphery of the metal mold with greater force than the lighter particles.

This centrifugal motion immediately helps to eliminate slag, non-metallics, and other impurities from the weld, by flotation due to weight differential, and the rejection tendency of the bath, with the result that they are kept away from the base metal of the metal mold, thus making denser metal, better fusion of the weld metal and the base metal. Also gas pockets and porosity are reduced.

It is also important to note that the first metal from the electrode is deposited centrifugally at, or flows outward from centrifugal force, to the periphery of the mold, which is relatively cooler, and which starts the cooling action at the outside, progressing toward the center, eliminating stresses set up by ordinary methods of deposit such as used in other portable welding tools.

It is also extremely important to note that in overhead welding, the centrifugal force applied only by this tool will immediately tend to overcome gravitational pull on the molten metal, occurring with conventional methods of deposit as used by other portable welding tools, wherein surface tension is the principal means of overcoming gravity.

Rotating speeds used in centrifugal casting are well known and in this case the range is from the lowest at which the metal will adhere and fuse to a mold wall of any given shape up to a speed where it will tend to leave the molten pool for reason of too high speed. Any desirable speed is easily obtained by this setting of the rheostat and number of rotations by arrangement of the cam.

In its broadest sense the means for moving the shaft axially could be either mechanical or electrical, and in various forms, and the drawing of the arc could be done without simultaneous rotation of the electrode carrying shaft. For example, the rotor of the motor could be directly connected to the tool shaft, and itself move axially with the shaft, or the drive to the tool shaft could be by a thick gear meshing with a thinner pinion on the tool shaft.

Having thus described my invention, what I claim as new and desire to secure by Letters Patent is:

1. A tool for arc welding comprising a support, a tool shaft mounted for rotary and sliding movement in the support, means for rotating the shaft, means on the shaft for grasping electro-conductively an electrode to be welded to a work piece, means for applying welding current to the tool shaft, and means operated by the tool shaft for sliding it against resilient pressure during rotation when the welding current is applied, and then releasing the shaft thereby thrusting the electrode into the work, while simultaneously disconnecting the welding current.

2. The combination of claim 1 in which the means for grasping the electrode is a clutch of material non-weldable to the electrode which holds the electrode in electrical contact with the tool shaft.

3. A tool for arc welding comprising a support, a tool shaft mounted for rotary and sliding movement in the support, a driving electric motor for rotating the tool shaft, means controlled by the operator for applying rotary motion to the motor selectively through different circuits, one of which is rheostat controlled, means on the shaft for electro-conductively grasping an electrode to be welded to a work piece, and means energized by the tool shaft for sliding it against resilient pressure during rotation when welding current is applied to the shaft, means for supplying welding current to the tool shaft when the motor is on the rheostat controlled circuit, and means energized by the shaft for opening all electric circuits and releasing the sliding means thereby thrusting the electrode into the work.

4. A tool for arc welding comprising a rotary shaft and means for securing an electrode to be welded into the work to the shaft, cam means on the shaft, driving connections for rotating the shaft so as to rotate the electrode into the work permitting that portion thereof connected to the electrode to be reciprocated, means for engaging the cam means for causing the shaft to reciprocate through a path defined by said cam means, operator controlled means for simultaneously applying welding current to the reciprocating portion of the tool shaft, and causing operation of the means for engaging the cam, and means operated by the tool shaft as a result of its reciprocatory motion for turning off the welding current and releasing the cam engaging means.

5. A tool for arc welding comprising a rotary shaft and means for securing an electrode to be welded into the work to the shaft, cam means on the shaft, driving connections for rotating the shaft so as to rotate the electrode into the work permitting that portion thereof connected to the electrode to be reciprocated, means for engaging the cam means for causing the shaft to reciprocate through a path defined by said cam means, operator controlled means for applying welding current to the reciprocating portion of the tool shaft, and simultaneously causing operation of the means for engaging the cam, and means operated by the tool shaft as a result of its reciprocatory motion for turning off the welding current and releasing the cam engaging means, said means for supplying welding current being arranged to be effective only upon the means for engaging the cam means entering into engagement with the cam surface.

6. A tool for arc welding comprising means for engaging an electrode and turning it into the work so as to penetrate an electro-conductive base to which it is to be welded, means initiated by the operator for raising the electrode by rotary motion when it has penetrated the base to an observed depth, means for applying welding current to the electrode when it is being raised by said rotary motion, and means for timing the raising step, terminating the application of welding current when the step has been completed, and means for then thrusting the electrode into the base.

7. A tool for arc welding comprising means for engaging an electrode and turning it into the work so as to penetrate an electro-conductive base to which it is to be welded, means initiated by the operator for raising the electrode by rotary motion when it has penetrated the base to an observed depth, means for applying welding current to the electrode when it is being raised by said rotary motion, and means for timing the raising step, terminating the application of welding current when the step has been completed, and means for then thrusting the electrode into the base, the means for turning the electrode into the work comprising an electric motor, two supply circuits for said motor with controls therefor and interconnection between the means for supplying the welding current to the electrode and controls for one of said supply circuits, and a set of electric contacts arranged to be connected by the means for raising the electrode, and adapted to shut off the welding current and terminate the raising step, this arrangement serving to produce the timing referred to.

8. In an electric welding tool, a tool shaft, cam means on the tool shaft, an electrically controlled abutment to engage the cam means thus causing the tool shaft to rise, an electric motor for rotating the tool shaft, means for so connecting the tool shaft to the motor that it can rise, resilient means for returning the tool shaft to its position prior to its rise upon withdrawal of said abutment, means for supplying welding current to the tool shaft upon inception of the rising motion thereof, and means for disconnecting the welding current upon completion of the rising motion of the tool shaft.

9. In an electric welding tool, a tool shaft, cam means on the tool shaft, an electrically controlled abutment to engage the cam means thus causing the tool shaft to rise, an electric motor for rotating the tool shaft to drive an electrode thereon into the work, means for so connecting the tool shaft to the motor that it can rise, resilient means for returning the tool shaft to its position prior to its rise upon withdrawal of said abutment, means for supplying welding current to the tool shaft upon inception of the rising motion thereof, and means for disconnecting the welding current upon completion of the rising motion of the tool shaft, the means for supplying welding current to the tool shaft being ineffective until first causing the abutment to engage the cam means.

10. A portable welding tool comprising a motor and motor shaft, a shaft driven thereby and arranged for reception of an electrode to be welded to rotate the same into the work, means for slidably connecting said shaft with the motor shaft, means for moving the driven shaft axially with respect to the motor shaft, and means co-incidental with said axial movement for applying welding current to the said driven shaft.

11. A portable welding tool comprising a motor and motor shaft, a shaft driven thereby and arranged for reception of an electrode to be welded to rotate the same into the work, means for slidably connecting said shaft with the motor shaft, means for moving the driven shaft axially with respect to the motor shaft, means co-incidental with said axial movement for applying welding current to the said driven shaft, and means for supplying current to the motor in a plurality of circuits, current being supplied thereby to the motor from a selected one of said circuits which is closed simultaneously with a necessary element of the axial moving means whereby the shaft is rotated during its axial movement.

12. A portable electric welding tool comprising means for detachably engaging an electrode to be welded, means operator controlled for rotating the said engaging means, means for moving said engaging means axially by virtue of the rotary motion, and interconnected therewith means for applying welding current to said engaging means whereby said electrode may be one which prepares a crater for itself in the work comprising the other electrode in the welding circuit, and whereby the axial movement may create a timing for the drawing of an arc.

ROBERT F. ZIMMERMAN.

REFERENCES CITED

The following references are of record in the file of this patent:

UNITED STATES PATENTS

| Number | Name | Date |
|---|---|---|
| Re. 22,411 | Nelson | Dec. 21, 1943 |
| 1,995,001 | Ito | Mar. 19, 1935 |
| 2,018,263 | Ito | Oct. 22, 1935 |
| 2,057,670 | Crecca | Oct. 20, 1936 |
| 2,096,495 | Hogg | Oct. 19, 1937 |
| 2,110,832 | Hogg | Mar. 8, 1938 |
| 2,193,490 | Rehse | Mar. 12, 1940 |
| 2,234,855 | Rehse | Mar. 11, 1941 |
| 2,307,026 | Crecca | Jan. 5, 1943 |